(12) United States Patent
Tsai et al.

(10) Patent No.: US 10,939,207 B2
(45) Date of Patent: Mar. 2, 2021

(54) MICROWAVE IMAGE PROCESSING TO STEER BEAM DIRECTION OF MICROPHONE ARRAY

(71) Applicant: HEWLETT-PACKARD DEVELOPMENT COMPANY, L.P., Spring, TX (US)

(72) Inventors: Ming-Shien Tsai, Taipei (TW); Yi-Kang Hsieh, Taipei (TW); Chung-Chun Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/480,944

(22) PCT Filed: Jul. 14, 2017

(86) PCT No.: PCT/US2017/042078
§ 371 (c)(1),
(2) Date: Jul. 25, 2019

(87) PCT Pub. No.: WO2019/013811
PCT Pub. Date: Jan. 17, 2019

(65) Prior Publication Data
US 2020/0128329 A1 Apr. 23, 2020

(51) Int. Cl.
*H04R 5/04* (2006.01)
*G06T 7/70* (2017.01)
(Continued)

(52) U.S. Cl.
CPC .................. *H04R 5/04* (2013.01); *G01S 7/35* (2013.01); *G01S 13/06* (2013.01); *G01S 13/89* (2013.01);
(Continued)

(58) Field of Classification Search
CPC .......... H04R 3/005; H04R 1/406; H04R 1/32; H04R 1/326; H04R 2410/01;
(Continued)

(56) References Cited

U.S. PATENT DOCUMENTS 4,246,580 A * 1/1981 Caputi, Jr. ............ G01S 13/904
342/25 F
9,451,361 B2 9/2016 Bar Bracha et al.
(Continued)

FOREIGN PATENT DOCUMENTS

EP 0977176 2/2000
WO WO-0056070 9/2000

OTHER PUBLICATIONS

Belakhindi, M et al, Microphone Array Beamforming, Jun. 24, 2016.
(Continued)

*Primary Examiner* — Leshui Zhang
(74) *Attorney, Agent, or Firm* — Tong, Rea, Bentley & Kim LLC

(57) ABSTRACT

In an example, a computing device includes a microphone array, a first antenna, a second antenna, and a processor. The microphone array includes a first microphone and a second microphone that collectively produce a beam to collect an audio sample from an audio source. The first antenna and the second antenna are positioned in proximity to the microphone array and collectively produce a field of microwave radiation. The processor tracks a position of the audio source relative to the computing device using microwave image processing and steers a direction of the beam in response to the position of the audio source.

18 Claims, 4 Drawing Sheets

(51) Int. Cl.
    *H04B 7/0408* (2017.01)
    *G01S 13/06* (2006.01)
    *G01S 7/35* (2006.01)
    *G01S 13/89* (2006.01)
    *H04R 5/027* (2006.01)

(52) U.S. Cl.
    CPC ............ *G06T 7/70* (2017.01); *H04B 7/0408* (2013.01); *H04R 5/027* (2013.01)

(58) Field of Classification Search
    CPC ............ H04R 2410/05; H04R 2201/40; H04R 2201/401; H04R 2201/403; H04R 2201/405; H04R 2430/20; H04R 5/04; H04R 5/027; G10L 21/0216; G10L 2021/02166; G01N 22/00; G01N 22/005; G01N 22/02; G01N 22/04; G06F 3/16; G06F 3/162; G06F 3/165; G06F 3/167; G06F 16/60; G06F 16/61; G06F 16/632; G06F 16/634; G06F 16/635; G06F 16/636; G06F 16/637; G06F 16/638; G06F 16/639; G06F 16/64; H04S 7/303; G06T 7/70; G01S 13/06; G01S 7/35; G01S 13/89; H04B 7/0408
    USPC .......... 381/26, 91, 92, 71.1–71.14, 73.1, 74, 381/94.1–94.8, 111, 112, 113, 114, 115, 381/119, 122, 123, 333; 700/94; 455/569.1, 370, 569.2, 575.2, 575.3, 455/575.4

See application file for complete search history.

(56) References Cited

U.S. PATENT DOCUMENTS

| | | | |
|---|---|---|---|
| 2012/0327115 A1* | 12/2012 | Chhetri | H04R 3/005 345/633 |
| 2013/0293408 A1* | 11/2013 | Underwood | G01S 13/42 342/146 |
| 2014/0105416 A1* | 4/2014 | Huttunen | H04R 3/005 381/92 |
| 2014/0372129 A1 | 12/2014 | Tzirkel-Hancock et al. | |
| 2016/0071526 A1 | 3/2016 | Wingate et al. | |
| 2016/0193732 A1 | 7/2016 | Breazeal et al. | |
| 2016/0249141 A1 | 8/2016 | Verdooner et al. | |
| 2017/0188140 A1* | 6/2017 | Duzinkiewicz | H04R 3/005 |
| 2017/0212059 A1* | 7/2017 | Charvat | G01S 13/887 |

OTHER PUBLICATIONS

Wang, J., Visual-information-assisted Microphone Array Processing in a High-noise Environment, Oct. 6, 1998.

* cited by examiner

MICROWAVE IMAGE PROCESSING TO STEER BEAM DIRECTION OF MICROPHONE ARRAY

BACKGROUND

Microelectro-mechanical systems (MEMS) microphones typically respond equally to sounds coming from any direction. As such, a plurality of microphones can be arranged in an array to form a directional response through beamforming. Beamforming (also referred to as "spatial filtering") is a signal processing technique that uses trigonometric functions to create a highly directional beam using a plurality of microphones that individually may have omnidirectional pickup responses. This highly directional beam may be focused on a source of an audio signal, such as a person who is speaking. As such, beamforming is commonly used to obtain input from a speaker during video chat sessions and similar applications.

DETAILED DESCRIPTION

The present disclosure broadly describes an apparatus, method, and non-transitory computer-readable medium for steering the beam direction of a microphone array using microwave image processing. As discussed above, beamforming is a signal processing technique that uses trigonometric functions to create a highly directional beam using a plurality of microphones that individually may have omnidirectional pickup responses. This highly directional beam may be focused on a source of an audio signal, such as a person who is speaking. However, if the microphone array has a fixed position, as may be the case when the microphone array is incorporated inside the chassis of a computing device, then the beamforming angle and direction are also fixed. Thus, if the speaker is not positioned directly in front of the microphone array (e.g., is standing up, walking around, has left the lid of a laptop computer partially closed, etc.), then the quality of the audio signal captured by the microphone array may be compromised.

Examples of the present disclosure use microwave image processing to steer a beam of a microphone array toward a source of an audio signal, such as a person who is speaking. In one example, a computing device such as a laptop or desktop computer includes a built-in microphone array that contains at least two microphones which collectively produce a beam for collecting voice samples from a speaker (e.g., a user of the computing device). A pair of 60 GHz (e.g., Wireless Gigabit Alliance/IEEE 802.11ad) antennas is integrated into the computing device (e.g., near the microphone array). Collectively, the antennas emit a spherical field of radiation. When the speaker's head enters this spherical field of radiation, microwave image processing techniques can be used to estimate the position of the speaker's head (and, thus, the source of the voice samples). The beam produced by the antenna array can then be steered to this position to improve the quality of the voice samples.

Figure 1:
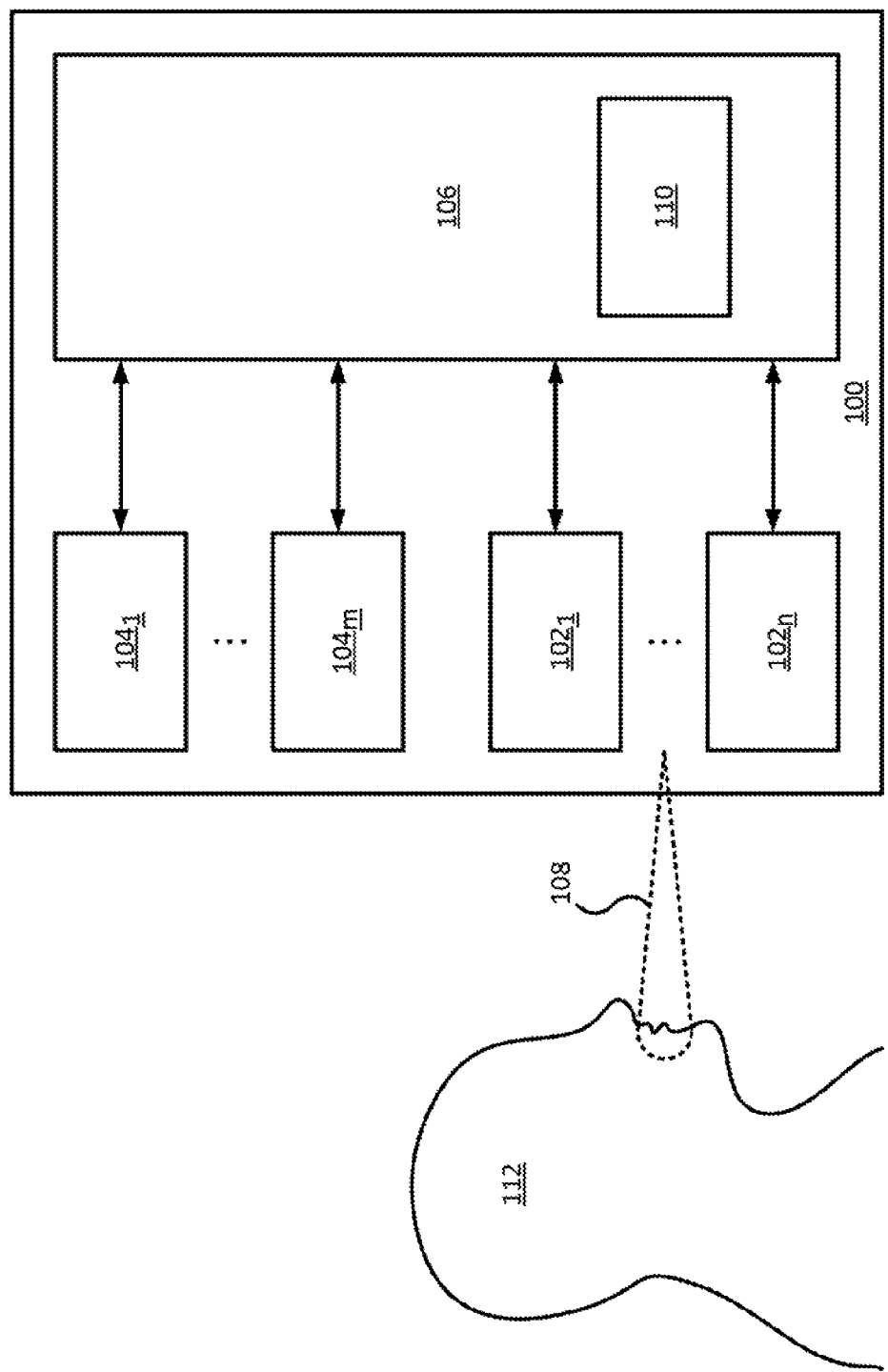
FIG. 1 depicts a high-level block diagram of an example computing device that uses microwave image processing to steer a beam of a microphone array toward a source of an audio signal.

FIG. 1 depicts a high-level block diagram of an example computing device 100 that uses microwave image processing to steer a beam of a microphone array toward a source of an audio signal. The computing device 100 may comprise, for instance, a desktop computer, a laptop computer, a tablet computer, a convertible computer (e.g., a computer whose configuration can be switched between a laptop configuration and a tablet configuration), a smart phone, a wearable smart device (e.g., a smart watch, fitness tracker, or the like), or any other computing device that includes a microphone array for capturing audio signals. As shown in FIG. 1, the computing device 100 generally comprises a microphone array including a plurality of microphones $102_1$-$102_n$ (hereinafter collectively referred to as "microphones 102"), a plurality of antennas $104_1$-$104_m$ (hereinafter collectively referred to as "antennas 104"), and a processor 110.

In one example, the microphone array comprises at least two microphones 102, i.e., a first microphone $102_1$ and a second microphone $102_n$. However, in other examples, the microphone array may include more than two microphones 102. In one example, the number of microphones 102 included in the microphone array depends on the type and form factor of the computing device 100. For instance, if the computing device 100 is laptop computer in which the display and the keyboard/processing unit are connected by a hinge, then the microphone array may include four microphones 102 (e.g., one microphone positioned at each corner of the keyboard). However, if the computing device is a desktop computer in which the display and the central processing unit (CPU) tower are not integrated, then the microphone array may include two microphones 102 (e.g., on microphone positioned at each lower corner of the display). In one example, the microphones 102 are microelectro-mechanical systems (MEMS) microphones.

In one example, the plurality of antennas 104 includes at least two sixty-gigahertz (60 Ghz) antennas, such as Wireless Gigabit Alliance (WiGig)/Institute of Electrical and Electronics Engineers (IEEE) 802.11ad microwave wireless fidelity (wifi) antennas. That is, the antennas 104 are compliant with the IEEE 802.11ad WiGig standard. In one example, the computing device 100 may include additional antennas that are not necessarily compliant with the IEEE 802.11ad WiGig standard, such as wireless local area network (WLAN) antennas).

Figure 2:
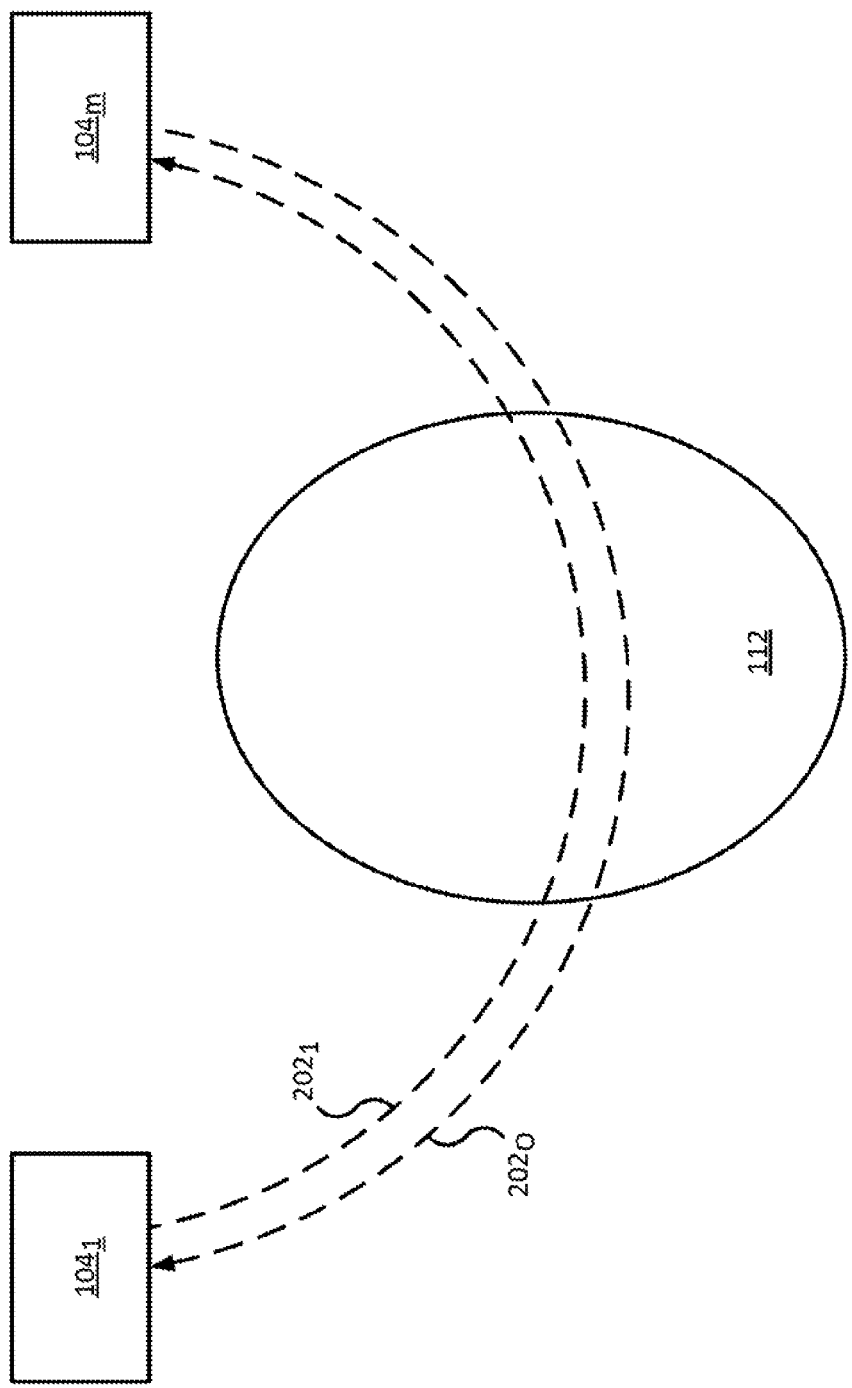
FIG. 2 depicts a schematic diagram illustrating an example field of microwave radiation produced by the antennas of FIG. 1.

As further illustrated in FIG. 2, which depicts a schematic diagram illustrating an example field 200 of microwave radiation produced by the antennas 104 of FIG. 1, the antennas 104 may communicate with each other. As such, each antenna 104 may include both a transmitter and a receiver. In one example, the antennas 104 communicate with each by exchanging microwave radio waves/signals $202_1$-$202_o$ (hereinafter collectively referred to as "signals 202"). Collectively the signals 202 form the generally spherical or hemispherical field 200 of microwave radiation. By "generally" spherical, it is meant that the field 200 of microwave radiation may not form a perfect sphere or hemisphere. For instance, the field 200 of microwave radiation may have a shape that resembles a portion of a sphere rather than a full sphere. Moreover, the field 200 of microwave radiation may not be perfectly symmetrical.

In one example, the processor 106 includes instructions 110 for performing microwave image processing using data collected by the antennas 104. As discussed in greater detail below, microwave image processing techniques may be used to estimate the position of a source 112 of an audio signal (e.g., the head, or in more specific examples the lips, of a speaker). For instance, when the source 112 enters the field 200 of microwave radiation produced by the antennas 104, the source 112 may obstruct the path of one or more of the signals 202 as illustrated in FIG. 2. The processor 106 may then steer a beam 108 that is collectively produced by the microphones 102 toward the estimated position of the obstruction (i.e., toward the estimated position of the source 112), in order to improve the quality of the audio signal that is captured by the microphone array.

Figure 3:
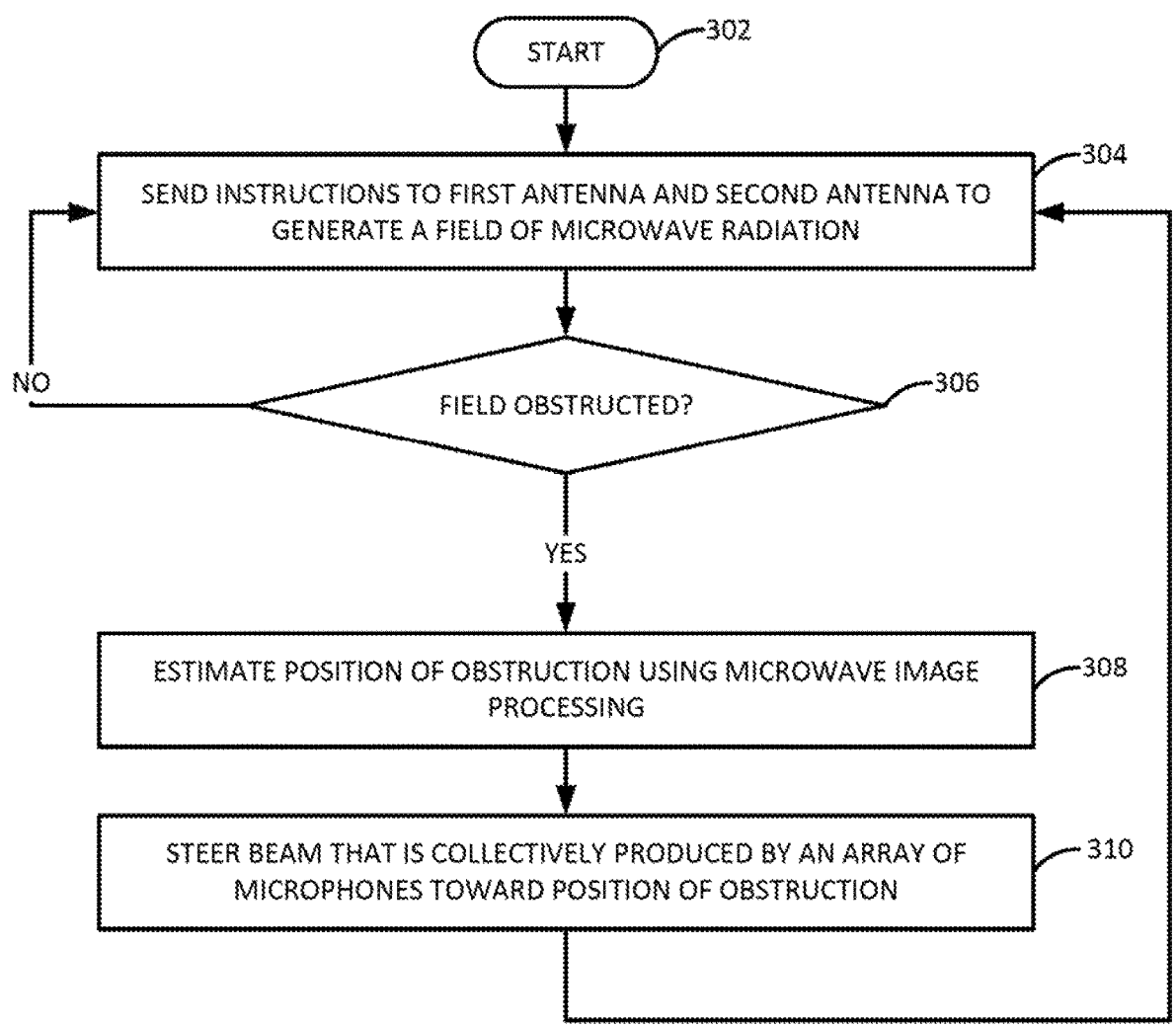
FIG. 3 illustrates a flow diagram of an example method for steering the beam direction of a microphone array using microwave image processing.

FIG. 3 illustrates a flow diagram of an example method 300 for steering the beam direction of a microphone array using microwave image processing. The method 200 may be performed, for example, by the processor 106 of the computing device 100 of FIG. 1. As such, reference may be made in the discussion of the method 300 to components of the computing device 100 of FIGS. 1 and 2. However, such references are made for the sake of example, and are not intended to be limiting.

The method 300 begins in block 302. In block 304, the processor 106 send an instruction to a plurality of antennas 104 to generate a field 200 of microwave radiation. As discussed above, the antennas 104 may comprise 60 GHz (e.g., WiGig/IEEE 802.11ad) antennas that emit or exchange microwave radio waves/signals 202. Collectively, these signals 202 may produce a field 200 of microwave radiation that has a generally spherical or hemispherical shape.

In block 306, the processor 106 determines whether the field 200 of microwave radiation has been obstructed. In one example, when an object or obstacle enters the field 200 of microwave radiation, the presence of the object or obstacle may cause attenuation (i.e., loss in intensity) in the signal field. In one example, an obstacle in the field 200 of microwave radiation is assumed to be a source (or a potential source) or an audio signal, such as a head of a speaker.

If the processor 106 concludes in block 306 that no obstruction in the field 200 of microwave radiation has been detected, then the method 300 may return to block 304. However, if the processor 106 concludes in block 306 that an obstruction has been detected, then the method 300 proceeds to block 308.

In block 308, the processor 106 estimates a position of the obstruction using microwave image processing of the microwave radio waves/signals 202.

In block 310, the processor 106 steers a beam 108 that is collectively produced by an array of microphones 102 toward the estimated position of the obstruction. In one example, the processor 106 employs one or more trigonometric functions to steer the beam 108, e.g., in accordance with a beamforming technique. Steering of the beam 108 may involve selecting a subset of the microphones 102 that form the microphone array to actively acquire audio input from the source of the audio signal.

Having steered the beam 108 to the estimated or likely position of the source of an audio signal, the method 300 may return to block 304 and repeat the above steps. In this way, microwave image processing techniques may be used to continuously track the position of the source of the audio signal and to adjust the steering of the beam 108, as appropriate, toward the source.

The method 300 may be initiated on demand (e.g., in response to an explicit user command) or in response to the launch of an application that utilizes the microphone array to acquire input (e.g., a dictation application, a video or audio chat application, or the like). Moreover, as discussed above, the method 300 may repeat one or more iterations in order to continuously track the source of an audio signal, which may move throughout the duration of an application utilizing the microphone array. Thus, the beam 108 may track with the source of the audio signal.

It should be noted that although not explicitly specified, some of the blocks, functions, or operations of the method 300 described above may include storing, displaying and/or outputting for a particular application. In other words, any data, records, fields, and/or intermediate results discussed in the methods can be stored, displayed, and/or outputted to another device depending on the particular application. Furthermore, blocks, functions, or operations in FIG. 3 that recite a determining operation, or involve a decision, do not imply that both branches of the determining operation are practiced. In other words, one of the branches of the determining operation may not be performed, depending on the results of the determining operation.

Figure 4:
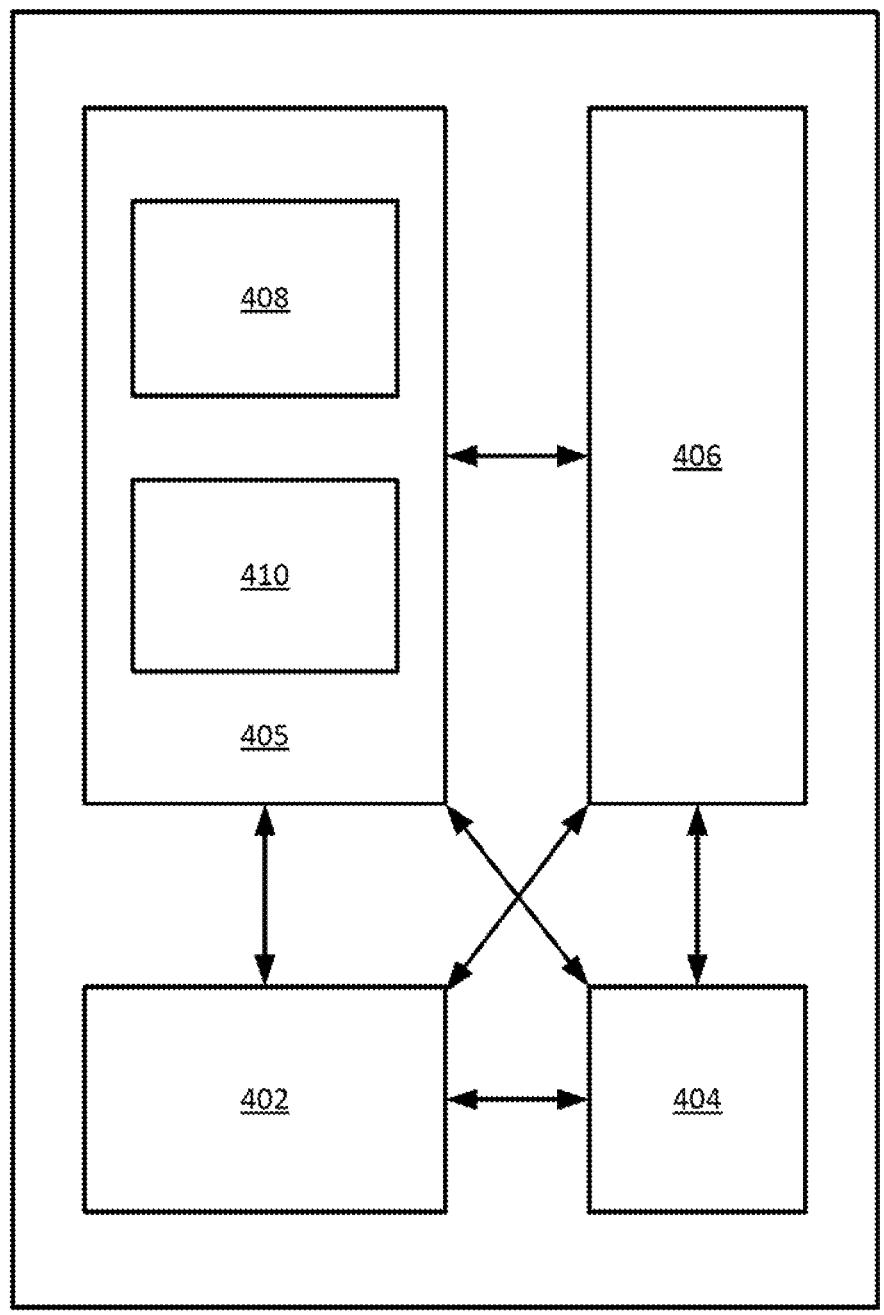
FIG. 4 depicts a high-level block diagram of an example computer that can be transformed into a machine capable of performing the functions described herein.

FIG. 4 depicts a high-level block diagram of an example computer 400 that can be transformed into a machine capable of performing the functions described herein. Notably, no computer or machine currently exists that performs the functions as described herein. As a result, the examples of the present disclosure modify the operation and functioning of a general-purpose computer to steer the beam direction of a microphone array using microwave image processing, as disclosed herein. For instance, the computing device 100 illustrated in FIG. 1 may be configured in a manner similar to the computer 400.

As depicted in FIG. 4, the computer 400 comprises a hardware processor element 402, e.g., a central processing unit (CPU), a microprocessor, or a multi-core processor, a memory 404, e.g., random access memory (RAM) and/or read only memory (ROM), a module 405 for steering the beam direction of a microphone array using microwave image processing, and various input/output devices 406, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, a transducer, and the like. Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method(s) are implemented across multiple or parallel general-purpose computers, then the general-purpose computer of this figure is intended to represent each of those multiple general-purpose computers. Furthermore, a hardware processor can be utilized in supporting a virtualized or shared computing environment. The virtualized computing environment may support a virtual machine representing computers, servers, or other computing devices. In such virtualized virtual machines, hardware components such as hardware processors and computer-readable storage devices may be virtualized or logically represented.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed methods.

In one example, instructions and data for the present module or process 405 for steering the beam direction of a microphone array using microwave image processing, e.g., machine readable instructions can be loaded into memory 404 and executed by hardware processor element 402 to implement the blocks, functions or operations as discussed above in connection with the method 300. For instance, the module 405 may include a plurality of programming code components, including a microwave image processing component 408 and a beam steering component 410.

The microwave image processing component 408 may be configured to control a plurality of antennas, such as 60 GHz (e.g., WiGig/IEEE 802.11ad) antennas, to produce a field of microwave radiation that may be used to detect the position of a source of an audio signal. For instance, the microwave image processing component 408 may be configured to perform blocks 304-308 of the method 300 described above.

The beam steering component 410 may be configured to steer a beam produced by an array of microphones in response to the detection of a position of a source of an audio signal. For instance, the beam steering component 410 may be configured to perform block 310 of the method 300 described above.

Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 405 for steering the beam direction of a microphone array using microwave image processing, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A computing device, comprising:
a microphone array comprising a first microphone and a second microphone that collect an audio sample from a user and collectively produce a beam of the audio sample that is collected;
a first antenna positioned in proximity to the microphone array;
a second antenna positioned in proximity to the microphone array, wherein the first antenna and the second antenna collectively produce a field of microwave radiation by exchanging a plurality of microwave signals with each other; and
a processor to track a position of the user relative to the computing device based on received microwave signals of the plurality of microwave signals, wherein the position of the user is tracked as an obstruction in a path of the received microwave signals, and wherein the processor is further to steer a direction of the beam toward the user in response to the position of the user that is tracked, such that computing device both tracks the position of the user and collects the audio sample from the user.

2. The computing device of claim 1, wherein the first antenna and the second antenna comprise sixty gigahertz Wireless Gigabit Alliance/Institute of Electrical and Electronics Engineers 802.11 ad microwave wireless fidelity antennas.

3. The computing device of claim 1, wherein the field of microwave radiation is spherical in shape.

4. A non-transitory machine-readable storage medium storing instructions of a method executable by a processor of a computing device, the instructions comprising:
instructions to capture an audio signal of a user using a first microphone and a second microphone of the computing device;
instructions to detect an obstruction in a field of microwave radiation collectively produced by a first antenna and a second antenna of the computing device which exchange a plurality of microwave signals with each other;
instructions to estimate a position of the user based on received microwave signals of the plurality of microwave signals, wherein the position of the user is tracked as an obstruction in a path of the received microwave signals; and
instructions to steer, in response to an estimate of the position, a beam that is collectively produced by the first microphone and a second microphone toward the position to improve a quality of the audio signal of the user that is captured, such that the computing device both tracks the position of the user and captures the audio signal of the user.

5. The non-transitory machine-readable storage medium of claim 4, wherein the first antenna and the second antenna comprise sixty gigahertz Wireless Gigabit Alliance/Institute of Electrical and Electronics Engineers 802.11ad microwave wireless fidelity antennas.

6. The non-transitory machine-readable storage medium of claim 4, wherein the field of microwave radiation is spherical in shape.

7. The non-transitory machine-readable storage medium of claim 4, wherein the instructions to steer comprise:
instructions to select the first microphone and the second microphone from among a plurality of microphones including the first microphone and the second microphone.

8. The non-transitory machine-readable storage medium of claim 4, wherein the position moves, and the instructions further comprise:
instructions to repeat the instructions to detect, the instructions to estimate, and the instructions to steer in order to track a movement of the position and adjust the steering of the beam toward the position as the position moves.

9. A method, comprising:
- capturing, by a processor of a computing device, an audio signal of a user using a first microphone and a second microphone of the computing device;
- detecting, by the processor, an obstruction in a field of microwave radiation collectively produced by a first antenna and a second antenna of the computing device which exchange a plurality of microwave signals with each other;
- estimating, by the processor, a position of the user based on received microwave signals of the plurality of microwave signals, wherein the position of the user is tracked as an obstruction in a path of the received microwave signals; and
- steering, by the processor in response to the estimating, a beam that is collectively produced by a first microphone and a second microphone of the computing device toward the position to improve a quality of the audio signal of the user that is captured, such that the computing device both tracks the position of the user and captures the audio signal of the user.

10. The method of claim 9, wherein the first antenna and the second antenna comprise sixty gigahertz Wireless Gigabit Alliance/Institute of Electrical and Electronics Engineers 802.11ad microwave wireless fidelity antennas.

11. The method of claim 9, wherein the field of microwave radiation is spherical in shape.

12. The method of claim 9, wherein the steering comprise: selecting the first microphone and the second microphone from among a plurality of microphones including the first microphone and the second microphone.

13. The method of claim 9, wherein the position moves, and the method further comprises:
- repeating the detecting, the estimating, and the steering in order to track a movement of the position and adjust the steering of the beam toward the position as the position moves.

14. The method of claim 9, wherein each of the first antenna and the second antenna includes a transmitter and a receiver.

15. The method of claim 14, wherein the detecting comprises detecting an attenuation of the field of microwave radiation caused by the obstruction.

16. The method of claim 9, wherein the user is a person who is speaking.

17. The method of claim 16, wherein the position is a position of a head of the person who is speaking.

18. The method of claim 17, wherein the person is moving while speaking.

* * * * *